(12) United States Patent
Takubo et al.

(10) Patent No.: US 6,471,007 B1
(45) Date of Patent: Oct. 29, 2002

(54) OIL MIST LUBRICATOR

(75) Inventors: Norihiko Takubo, Osaka (JP);
Nobuyuki Ikeda, Osaka (JP);
Yuuichirou Koike, Osaka (JP)

(73) Assignee: Vogel Japan Ltd., Osaka (JP)

( * ) Notice: Subject to any disclaimer, the term of this patent is extended or adjusted under 35 U.S.C. 154(b) by 56 days.

(21) Appl. No.: 09/718,126

(22) Filed: Nov. 15, 2000

(30) Foreign Application Priority Data

Nov. 18, 1999 (JP) .......................................... 11-328244

(51) Int. Cl.⁷ ................................................ F16N 11/10
(52) U.S. Cl. ........................................ 184/50.2; 184/43
(58) Field of Search ............................. 184/50.2, 39.1, 184/40, 43, 54

(56) References Cited

U.S. PATENT DOCUMENTS 4,018,303 A * 4/1977 White et al. ................ 184/15.1
4,976,854 A * 12/1990 Yano et al. ................. 184/6.24
4,997,556 A * 3/1991 Yano et al. ................. 184/6.24

FOREIGN PATENT DOCUMENTS

JP 11-351361 A * 12/1999

* cited by examiner

Primary Examiner—Pam Rodriguez
(74) Attorney, Agent, or Firm—Wenderoth, Lind & Ponack, L.L.P.

(57) ABSTRACT

An oil-mist lubricator is provided that can stably supply oil mist uniform in particle diameter, and that can also be used for the supplying of cutting oil in minute-amount cutting. An oil-mist lubricator turns oil into oil mist after the oil is discharged from a fixed displacement pump that sucks a and discharges oil in an oil tank. In this lubricator, a cyclone is provided for selecting only oil mist having a suitable particle diameter from among the oil mist and discharging it under centrifugal force produced inside thereof. It is thus possible to separate the oil mist into smaller and larger mist particles under centrifugal force and stably supply oil mist that is small and uniform in particle diameter.

13 Claims, 2 Drawing Sheets

OIL MIST LUBRICATOR

BACKGROUND OF THE INVENTION

This invention relates to an oil mist lubricator that can supply lubricating oil in the form of oil mist to frictional parts of machine elements that need lubrication such as bearings and gears and also can be used to supply cutting oil in between an article to be worked and a cutting tool.

A conventional oil-mist lubricator for supplying lubricating oil to frictional portions comprises an oil tank, a fixed displacement pump for sucking and discharging oil in the oil tank, and an atomizer for atomizing oil discharged from the fixed displacement pump into oil mist. It was adapted to select only small oil mist particles by free fall and supply them.

With this conventional oil-mist lubricator, under the pressure of discharged wind, lubricating oil having large particle diameters or liquid oil, which should not be discharged through the discharge port, tends to be discharged after flowing along the wall surface of the selecting portion. Thus oil mist is liquefied in the piping between the atomizer and the nozzle of spraying. Thus, an expected amount of oil mist was not sprayed at each lubricating point.

Also, since it was impossible to easily adjust the particle diameter of oil mist discharged, application was limited to lubrication of e.g. bearings. It can not be used for minute-amount cutting in which only oil mist having small particle diameters is needed in spite of the fact that the same system is employed.

An object of this invention is to provide an oil-mist lubricator that can stably supply oil mist uniform in particle diameter, and that can also be used for the supply of cutting oil in minute-amount cutting.

SUMMARY OF THE INVENTION

According to the invention, there is provided an oil-mist lubricator comprising an oil tank, a fixed displacement type pump for sucking and discharging oil in the oil tank, and an atomizer for turning the oil discharged from the fixed displacement pump into oil mist, characterized in that the lubricator further comprises a cyclone for separating only oil mist having a suitable particle diameter and discharging it under centrifugal force produced in the cyclone through a discharge port.

According to the invention, inside the cyclone, a flow-out preventive member is provided for preventing liquid oil from flowing out through the discharge port under wind pressure.

According to the invention, the cyclone is provided with a secondary air supply port for increasing the wind speed in the cyclone, and a throttle valve is provided in a secondary air supply port.

Other features and objects of the present invention will become apparent from the following description made with reference to the accompanying drawings, in which:

DETAILED DESCRIPTION OF THE PREFERRED EMBODIMENT

Figure 1:
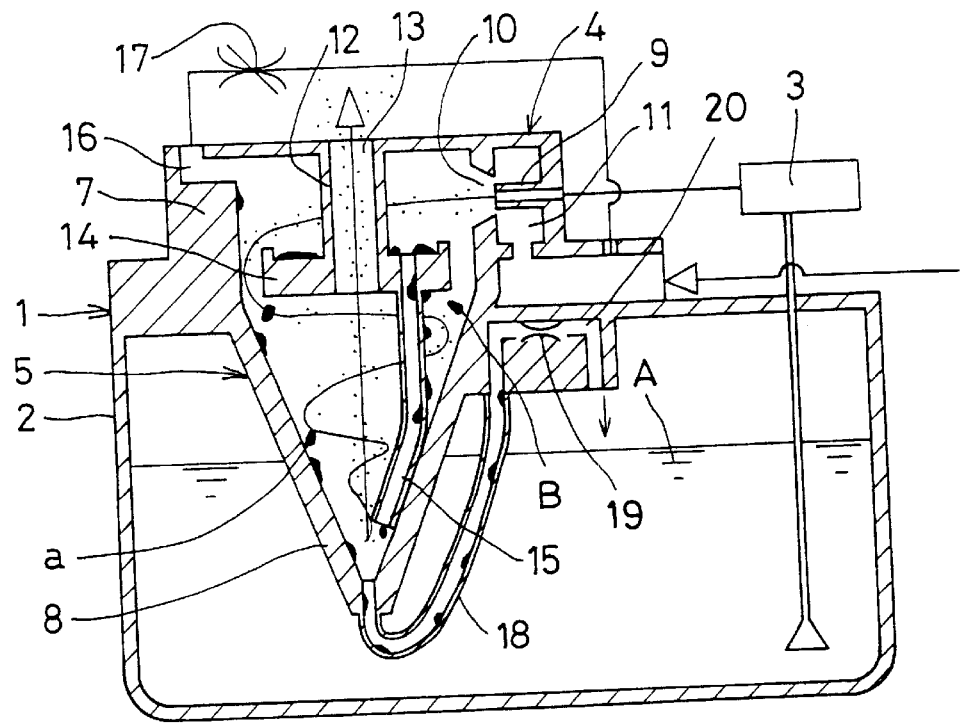
FIG. 1 is a vertical sectional view of an oil-mist lubricator embodying the present invention.
Figure 2:
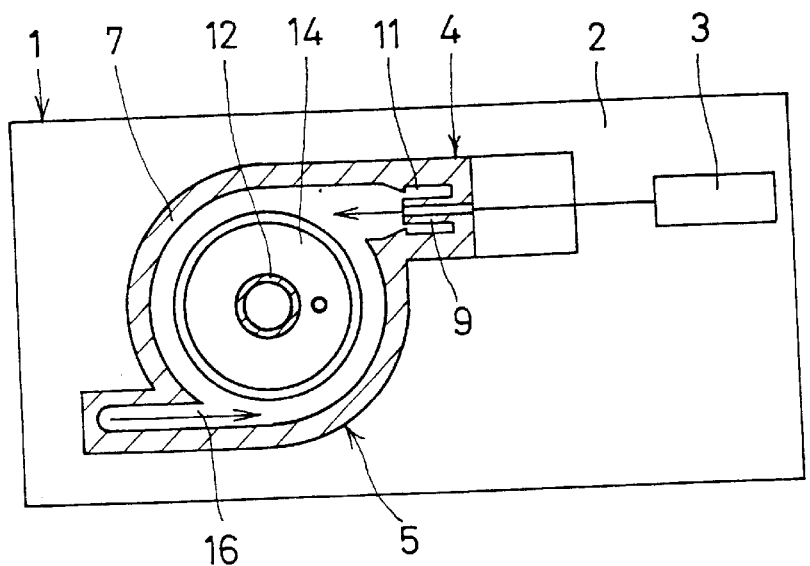
FIG. 2 is a cross-sectional view of the same.
Figure 3:
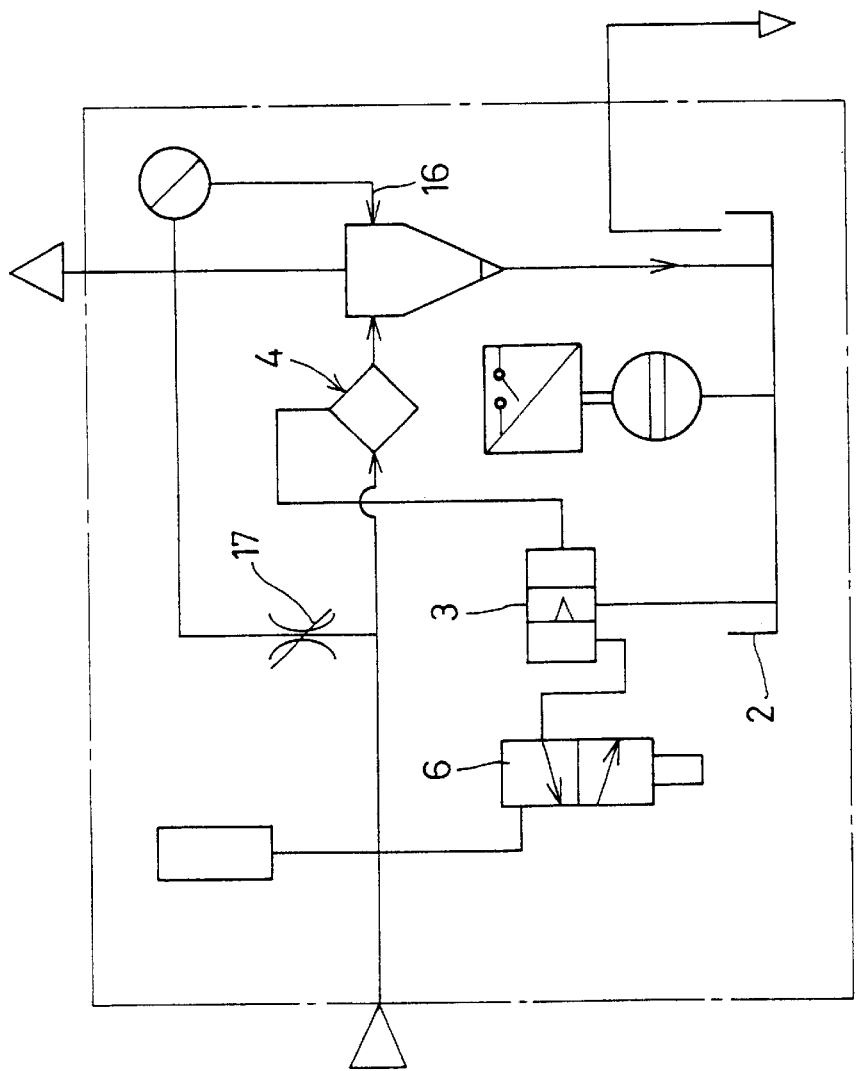
FIG. 3 is a circuit diagram of the same.

Hereinbelow, an embodiment of this invention is described with reference to the drawings.

In the figures, an oil-mist lubricator 1 comprises an oil tank 2, a fixed displacement pump 3 for sucking and discharging oil A in the oil tank 2, an atomizer 4 for turning oil discharged from the fixed displacement pump into oil mist, and a cyclone 5 for selecting only oil mist having a suitable particle diameter from the oil mist and discharging it by centrifugal force. With the fixed displacement pump 3, pressure fluid from a pressure fluid supply source is changed over by a solenoid valve 6 to control discharge and suction of oil.

The atomizer 4 and the cyclone 5 are provided integrally on top of the oil tank 2. Under a cylindrical portion 7, the cyclone 5 is provided with a conical separating portion 8 protruding into the oil tank 2. The atomizer 4 is provided outside the cylindrical portion 7.

The atomizer 4 has a nozzle 9 for jetting oil discharged from the fixed displacement pump 3 protruding into a primary air supply port 10 formed in the cylindrical portion 7 of the cyclone 5. Around the nozzle 9, a primary air supply passage 11 communicating with the primary air supply port 10 is provided. Since air flow passing through the primary air supply port 10 is extremely fast, oil discharged from the nozzle 9 is turned into oil mist. The oil mist from the nozzle 9 is blown in a tangential direction into the cylindrical portion 7 of the cyclone 5 together with the primary air.

The cyclone 5 has a discharge pipe 12 arranged coaxially at a central portion inside the cylindrical portion 7. At the top end of the discharge pipe 12 there is a discharge port 13 opening to outside of the cyclone 5.

Oil mist discharged from the discharge port 13 is guided to lubricating and cutting portions. At the bottom end of the discharge pipe 12, a flow-out preventive member 14 for preventing liquid oil B from flowing out toward the discharge port 13 under wind pressure is provided.

The flow-out preventive member 14 is a disk-shaped dish having its top surface recessed and is provided coaxially in the cylindrical portion 7. Between its outer peripheral surface and the inner wall of the cylindrical portion 7, a narrow passage is formed. A pipe 15 opening at its recessed portion has a bottom end guided toward the a bottom of the conical portion 8.

In the cylindrical portion 7 of the cyclone 5, a secondary air supply portion 16 is provided at e.g. a position opposite the primary air supply port 10 with the axis therebetween. In a mid-portion of the passage toward the secondary air supply portion 16, a throttle valve 17 is provided.

The oil-mist lubricator of this invention is structured as described above. When the fixed displacement pump 3 is activated, oil A in the oil tank 2 is sucked up. The oil discharged from the fixed displacement pump 3 is turned into oil mist by the atomizer 4. Oil mist from the nozzle 9 is blown into the cylindrical portion 7 of the cyclone 5 through the air supply port 10 together with primary air.

As shown in FIG. 1, the oil mist blown into the cyclone 5 together with air flows downwardly in the conical portion 8 while forming a spiral "a" under centrifugal force, and then flows up into the discharge pipe 12 at the upper central portion. Oil mist discharged from the discharge port 13 is guided to lubricating portions and cutting portions.

Of the oil mist blown into the cyclone 5, the oil mist having smaller particle diameters tends to gather to the center and the oil mist having larger diameters gathers to the outside by the action of centrifugal force. Liquid oil stuck on the inner periphery of the conical portion 8 of the cyclone 5 is pushed down by whirling air and returned into the oil tank 2 from the bottom of the conical portion 8 through a pipe 18 and a passage 20 with a throttle valve 19. On the other hand, oil pushed up to the upper portion of the cylindrical portion 7 of the cyclone 5 under wind pressure flows along the outer wall of the discharge pipe 12, is caught on the top surface of the flow-out preventive member 14, passes through the pipe 15, and is returned into the oil tank 2 through the bottom portion of the conical portion 8 in the same manner as described above.

Thus, oil that is not turned into oil mist and pushed up by air onto the upper portion of the cylindrical portion 7 in the cyclone 5 is caught by the flow-out preventive member 14. Since entering of liquid oil into the discharge port 13 is suppressed, it is possible to stably supply oil mist that is small and uniform in particle diameter to the discharge port 13 through the discharge pipe 12.

Also, into the cyclone 5, secondary air whose flow rate is set by the throttle valve 17 is blown, so that the flow speed of air in the cyclone 5 is increased. This ensures separation between large and small oil mists, so that it is possible to discharge only oil mist having smaller particle diameters through the discharge port 13. Thus, it is possible to use the oil-mist lubricator 1 for minute-amount cutting.

As described above, according to this invention, in an oil-mist lubricator for turning oil discharged from a fixed displacement pump into oil mist, a cyclone is provided for selecting only oil mist having a suitable particle diameter and discharging it under centrifugal force produced inside thereof. Thus, it is possible to separate oil mist into smaller and larger mist particles under centrifugal force and stably supply oil mist that is small and uniform in particle diameter. Also, it is possible to spray an assumed amount of oil mist to a lubricating point.

Also, since it is possible to stably supply oil mist having smaller particle diameters by blowing secondary air, this device can be used for the supply of cutting oil in minute-amount cutting.

What is claimed is:

1. An oil-mist lubricator comprising an oil tank, a fixed displacement pump for sucking and discharging oil in said oil tank, an atomizer for turning the oil discharged from said fixed displacement pump into oil mist comprising small and large diameter oil mist particles, and a cyclone for separating only the small diameter oil mist particles and discharging the small diameter oil mist particles under centrifugal force produced in said cyclone through a discharge port.

2. The oil-mist lubricator as claimed in claim 1 wherein inside said cyclone, a flow-out preventive member is provided for preventing liquid oil from flowing out through said discharge port under wind pressure.

3. The oil-mist lubricator as claimed in claim 1 wherein said cyclone is provided with a secondary air supply port for increasing the wind speed in said cyclone, and wherein a throttle valve is provided in a secondary air supply line.

4. The oil-mist lubricator as claimed in claim 2 wherein said cyclone is provided with a secondary air supply port for increasing the wind speed in said cyclone, and wherein a throttle valve is provided in a secondary air supply line.

5. An oil-mist lubricator comprising an oil tank, a fixed displacement pump for sucking and discharging oil in said oil tank, an atomizer for atomizing the oil discharged from said fixed displacement pump, and a cyclone having a conical separating portion and a discharge port, said conical separating portion being arranged to separate the oil mist under centrifugal force by causing larger diameter mist particles to move outwardly away from a center thereof and smaller diameter mist particles to move inwardly toward the center thereof, and said discharge port being arranged to discharge the smaller diameter mist particles that have moved inwardly toward the center of said conical separating portion.

6. The oil-mist lubricator as claimed in claim 5, wherein said cyclone further includes a return pipe arranged to return the larger diameter mist particles that have moved outwardly away from the center of said conical separating portion to said oil tank.

7. The oil-mist lubricator as claimed in claim 6, wherein said return pipe is connected to a bottom of said conical separating portion.

8. The oil-mist lubricator as claimed in claim 5, wherein inside said cyclone, a flow-out preventive member is provided for preventing liquid oil from flowing out through said discharge port under wind pressure.

9. The oil-mist lubricator as claimed in claim 8, wherein said flow-out preventive member comprises a disk member provided at a top end of said conical separating portion.

10. The oil-mist lubricator as claimed in claim 9, wherein said disk member is coaxial with said conical separating portion and is arranged to provide a narrow passage between an outer periphery of said disk member and an inner periphery of said conical separating portion.

11. The oil-mist lubricator as claimed in claim 10, wherein said disk member has a recess in an upper surface thereof, and a pipe opens into said recess and extends down toward a bottom portion of said conical separating portion.

12. The oil-mist lubricator as claimed in claim 8 wherein said cyclone is provided with a secondary air supply port for increasing the wind speed in said cyclone, and wherein a throttle valve is provided in a secondary air supply line.

13. The oil-mist lubricator as claimed in claim 5 wherein said cyclone is provided with a secondary air supply port for increasing the wind speed in said cyclone, and wherein a throttle valve is provided in a secondary air supply line.

* * * * *